July 18, 1967 H. C. ANDERSON 3,332,072
SPIN RESONANT TRANSDUCER AND PROCESS
Filed July 15, 1964

*INVENTOR*
HAROLD C. ANDERSON

BY *Alfred B. Levine*

ATTORNEY

United States Patent Office 3,332,072
Patented July 18, 1967

3,332,072
SPIN RESONANT TRANSDUCER AND PROCESS
Harold C. Anderson, Rockville, Md., assignor to Litton Systems, Inc., Silver Spring, Md.
Filed July 15, 1964, Ser. No. 382,785
9 Claims. (Cl. 340—173)

ABSTRACT OF THE DISCLOSURE

A process for transducing high frequency signals employing spin resonant materials wherein the transducer provides a standing wave of the signal with the maxima of each frequency component being spatially separated from the other components and having a spin resonant material disposed at the different positions of the maxima and tuned to the frequency of that component.

---

Figure 1:
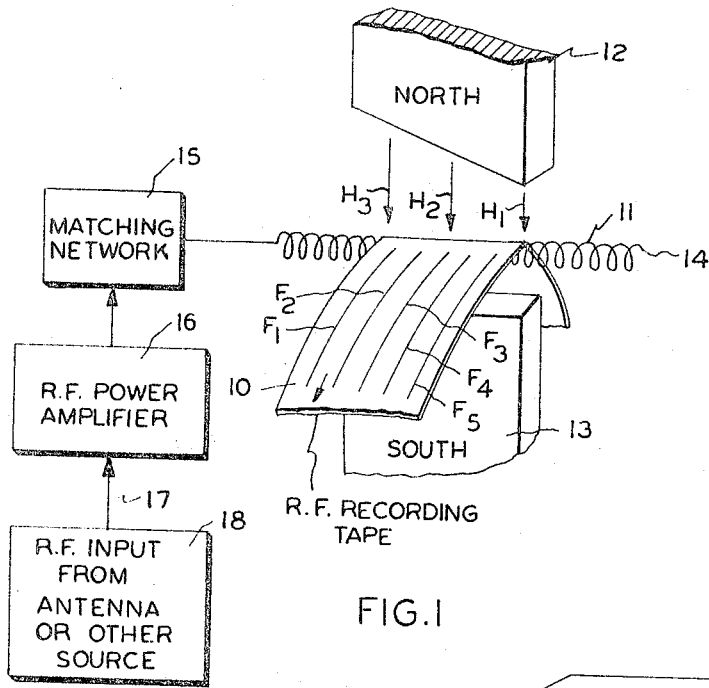

This invention relates to improvements in the transducing of radio frequency signals, and more particularly to the transducing of time varying radio frequency signals into images at different frequencies that may more easily be recorded, stored, or displayed.

In a copending application of Kenneth E. Peltzer Ser. No. 102,429, now patent No. 3,152,321, of the same assignee, there is disclosed a spin resonant transducing process for converting time varying radio signals into heat images or patterns having characteristics corresponding to the time variations of the signal. In this process, energy from the radio signal is absorbed by a spin resonant material and reradiated in the form of heat images or patterns corresponding to the time variations, and the patterns are recorded or displayed by heat responsive mediums.

In other applications of Francis A. Ryder, Ser. No. 292,405, now patent No. 3,137,841; Harold C. Anderson et al., Ser. No. 292,407, now patent No. 3,134,094; and Harold C. Anderson, Ser. No. 292,406, now patent No. 3,134,093; all of the same assignee, there is disclosed other spin resonant transducers for radio frequency signals employing cavities or waveguides. In these cavity type transducers, the spin resonant transducing material is usually located within the cavity where the transducing or conversion of the radio frequency signal occurs, and a recording tape or other display mechanism is applied to the cavity to record or otherwise readout the converted signals.

According to the present invention, there is provided a different manner of transducing signals than those previously disclosed and employing a time delay or wave reinforcing medium, such as a high frequency slow wave structure, instead of a cavity or waveguide. By means of this different transducing structure, a much wider frequency bandwidth of radio frequency signals may be converted and recorded than in the above-mentioned cavity type transducers to provide a more versatile transducing method and apparatus.

In both the present application and the prior applications discussed above, the spin resonant material employed is frequency sensitive and tunable to respond to different frequencies of the radio signal whereby the radio signal is divided into its different frequency components and the different frequency components are separately recorded to provide frequency spectrum images of the signal.

It is accordingly a principal object of the invention to provide a radio frequency recording transducer and method for converting a wider bandwidth of radio frequency signals into recordable images.

A further object is to provide such a transducer for converting the radio signal into frequency spectrum images.

A still further object is to provide a transducing apparatus for separating the component frequencies of a radio signal, and converting the separated frequency components into recordable images at displaced positions.

Figure 2:
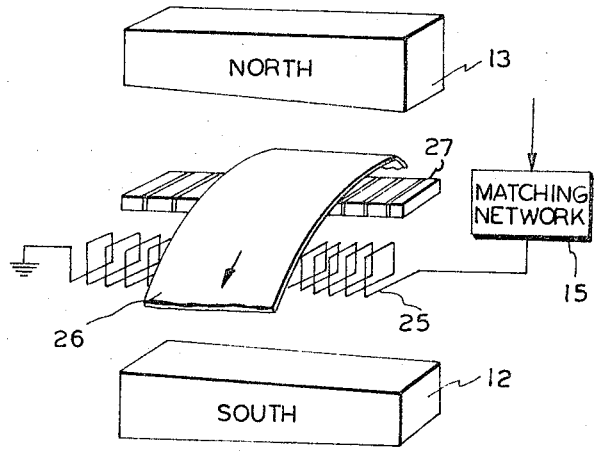
Figure 3:
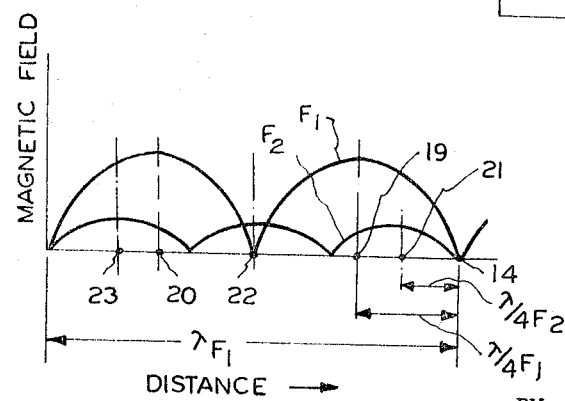

Other objects and many additional advantages will be more readily understood by those skilled in this art after a detailed consideration of the following specification taken with the accompanying drawing wherein:

FIG. 1 is a schematic illustration of one preferred transducer according to the invention, FIG. 2 is an illustration similar to FIG. 1 and showing an alternative embodiment, and FIG. 3 is a plot illustrating the standing wave pattern of the magnetic field intensity along the length of a high frequency slow wave structure.

Referring to the drawings, there is shown in FIG. 1 a wide bandwidth transducer according to the invention for converting an incoming frequency signal 18 into its frequency components to be recorded on a radio frequency sensitive recording tape 10.

As shown, the transducer comprises a slow wave structure in the form of a helix 11 having one terminal that is open circuited at 14 and having the other terminal interconnected through a matching network 15 and a power amplifier 16 to the incoming radio frequency signal 18 to be recorded.

The slow wave helix 11 is disposed within a nonuniform or nonhomogenious magnetic field, variable along the length of the helix, and provided by a pair of magnetic poles 12 and 13 positioned on opposite sides of the helix 11. As shown, the pole face of the upper magnet 12 is uniformly inclined away from the face of the lower magnet 13 to provide a progressively increasing airgap between the poles from right-to-left and thus provides a progressively decreasing magnetic field along the length of the helix and transversely across the recording tape 10.

The web of recording tape 10 is passed over that portion of the helix 11 disposed within the nonuniform magnetic field and therefore is jointly energized by this nonuniform field from magnets 12 and 13 and also by the radio frequency magnetic field produced about the windings of slow wave helix 11 from signal 18.

According to a first embodiment of the invention, the magnetic recording tape 10 is comprised of a base web or carrier that incorporates a spin resonant material imbedded therein or as a coating, which material is absorptive of radio frequency magnetic fields and produces heat patterns when exposed to such a field. This tape also incorporates a heat responsive indictaor which responds to any heat produced to indicate or display the patterns.

As discussed in the earlier applications above, such spin resonant materials are frequency sensitive and may be tuned into resonance with preselected frequency components of the RF field by means of a static or low frequency magnetic field, as produced by magnets 12 and 13. Consequently, by subjecting the tape 10 to a non-uniform magnetic field that varies for each position across the tape, each such position across the tape 10 is selectively tuned by the magnetic field to respond to a different frequency component of the radio frequency field produced by the helix 11, and correspondingly record only that freqeuncy component, in the event that it is present in the incoming radio frequency signal 18.

In operation, the slow wave structure 11 is designed to pass the radio frequency bandwidth of signals to be transduced and recorded, and the recording tape 10 is selected to be of a desired width and to be so positioned with respect to the open circuited end 14 of the helix, that each of the radio frequency signal components being passed by the helix 11 produces a standing wave pattern of its radio frequency magnetic field having a maxima located at a different position across the width of the recording tape. The magnetic poles 12 and 13 are also so adjusted that the intensity of the static magnetic field at each such position across the tape is such as to render the spin resonant material on the tape 10 at that position frequency sensitive to only that radio frequency signal having a maxima of its standing wave pattern at this position. Under these conditions, the slow wave transducer structure 11 functions to separate each of the component frequencies of the incoming radio signal and to apply each such frequency component at a different position across the tape as generally indicated by the lines on the tape designated $F_1$, $F_2$, $F_3$, $F_4$, and $F_5$. These different frequency components are therefore selectively recorded at the different positions across the tape to provide spectral images.

In the embodiment of the invention shown by FIG. 2, the transducer structure is similar to that of FIG. 1, but incorporates a stationary mass of spin resonant material 27 as an integral part of the transducer structure rather than incorporating the spin resonant material as part of the recording tape 26. In this case, the mass 27 may be supported above the helix 25 as shown, or within the turns of the helix, provided that it is located in energy absorptive relationship with the radio frequency magnetic field pattern being produced by the helix. As in the embodiment of FIG. 1, the nonuniform tuning field from magnets 12 and 13 tunes each position on the mass 27 to a different frequency and the slow wave structure separates the incoming radio signals into its integral frequency components to apply each frequency to its proper tuned position on the mass. The absorption of these frequencies by the mass 27 results in a corresponding heat pattern being produced which heat pattern is recorded on a tape 26 containing a heat responsive indicator.

In this manner, for each variation in the incoming signal 18, there is produced in the stationary mass 27, a pattern of different heat generating positions corresponding to the spectrum of frequency components in the incoming radio signal. For recording these spectral heat patterns, the recording tape 26 may contain a layer of thermotropic dye or other heat sensitive indicating medium which changes color when exposed to heat. Alternatively other forms of heat sensitive recording tape may be used with the transducer embodiment of either FIGS. 1 and 2 such as disclosed in copending applications of the same inventor which are now patents 3,316,119 and 3,281,856.

The transducer of the present invention may be employed to record or display either continuous wave radio frequency signals or modulated frequency radio signals, such as pulse modulated signals. For recording a continuous wave signal, a standing wave is produced about the helix as described above due to reflections of the signal from the open termination 14; and the helix 11 is properly matched by its input network 15 when substantially all of the energy of signal 18 is reflected from the termination 14.

For recording a pulse modulated signal, the operation is substantially the same as described except that the pulses are time delayed in traveling the slow wave structure. However, since each position along the tape of FIG. 1, or the stationary mass of FIG. 2, is magnetically tuned to absorb only a different frequency component, the recording of that frequency component occurs only at the tuned position as in the continuous wave embodiment even although all positions across the tape are scanned by the traveling pulses.

For a more detailed understanding of the helix and the manner in which it separates the frequency components of the signal 18 as described, reference is made to the diagram of FIG. 3. As is known to those skilled in the art, when a slow wave structure is energized by a continuous radio frequency wave, it provides a standing wave of the electromagnetic field about its windings whose amplitude or intensity varies from position to position along the length of the helix, thereby providing positions of maxima and minima intensity of the RF field that are separated from one another by distances of one quarter wavelength at the frequency involved.

When the end terminal 14 of the helix 11 is open circuited as in FIG. 1, the current in the helix is at a minimum at the open circuited position and the voltage is at a maximum at this position. Consequently the radio frequency magnetic field being produced by all of the frequency components is also at a minimum at the open circuited position 14. Thus, for a signal at one radio frequency such as frequency $F_1$ traveling the slow wave structure, the maximum amplitude of the standing wave magnetic field occurs at positions 19 and 20 of the helix 11, which positions correspond to the odd number quarter wavelengths at the frequency $F_1$. Similarly, for the higher frequency $F_2$, a null or minima of the standing wave magnetic field also occurs at the open circuited end of the helix 14, and the maxima occur at different positions 21, 22, and 23 constituting the odd number quarter wavelengths at the higher frequency $F_2$.

In the same manner, each different frequency component of the incoming radio signal 18 has a minima magnetic field or null at the open end of the helix 11, and provides a series of equally spaced positions having maximum intensity that are displaced from those of the other frequency signals in proportion to the different wavelength or frequency of that component. Thus, the slow wave helix provides a separation of the different frequency components in the incoming signals and therefore applies the maxima or maximum intensity of each different frequency at a different position along the width of the recording tape 10 as in the embodiment of FIG. 1, or alternatively, provides this maxima for each frequency component at a different position along the length of the stationary spin resonant mass 27 as in the embodiment of FIG. 2. Since each displaced position is also tuned by the static magnetic field from magnets 12 and 13 to respond to the same preselected frequency component, the various frequencies in the incoming radio signal are both separated and recorded at the different positions to provide the desired frequency spectrum heat patterns.

As generally discussed earlier, one of the significant advantages of the present transducer construction over transducers using waveguides or cavaties is the fact that the traveling wave structure permits a much wider bandwidth of signals to be transduced at a higher efficiency than does a waveguide or a cavity. More specifically, the traveling wave structure can be constructed to pass a bandwidth of better than two to one, such as from 6 kilomegacycles to 13 kilomegacycles without markedly attenuating the frequencies at either end of the band. A waveguide or cavity construction on the other hand cannot be designed to pass this wide bandwidth of frequencies without markedly attenuating the frequencies at the opposite ends of the band and therefore is limited to efficiently detecting a narrow frequency spectrum.

As a practical example of the application of the present invention, let it be assumed that it is desired to provide such a transducer for recording a frequency spectrum over the bandwidth of from 8 to 12 kilomegacycles, using a narrow width recording tape, having a width of about three centimeters (or slightly more than one inch in width). In this case, it is desired that the signal component at 8 kilomegacycles be recorded at the left hand end of the tape and that the signal at 12 kilomegacycles be recorded at the right hand end of the tape; and that the other frequency components between these limits be progressively recorded between these two positions. The wavelength of the 8 kmc. signal in free space is 3.7472 centimeters, and its wavelength along the helix or slow wave structure is at about 1/10 of this amount or .37 centimeter. Similarly, at a frequency of 12 kmc., the free space wavelength is 2.4981 centimeters and its wavelength along the helix is about 1/10 of this amount or .25 centimeter.

For recording these two frequencies at opposite ends of the recording tape, it is desired that the maxima of the standing wave for each signal occur at these end positions. Selecting the length of the helix to include at least 25 wavelengths of the standing wave at each frequency, it is seen that the distance from the left hand end of the recording tape to the open circuited termination 14 should be at (25×.37) or at a distance of 8.25 centimeters. Similarly, the distance from the open termination 14 to the right hand end of the tape should be at (25×.25) or at a distance of 6.25 centimeters. Therefore, employing a slow wave helix of about 10 centimeters in length (about 4 inches long) and a recording tape of about 2 centimeters wide (slightly less than one inch) with the left hand side of the tape located at 8.25 centimeters from the open circuited end 14, a bandwidth of from 8 to 12 kmc. may be recorded across the tape.

In the same manner as discussed, each of the other frequencies within this bandwidth will be progressively recorded at different positions between these two ends, since the standing wave pattern at these different frequencies produces maximas at intermediate positions progressively across the tape, and the static-magnetic field may be adjusted at these intermediate positions to record these other frequency components.

In the diagram of FIG. 3, the standing wave patterns of the various frequencies are shown for a slow wave structure or helix having its free termination open circuited as in the embodiment of FIG. 1. A similar type standing wave pattern is obtained where the free termination is short circuited, as in FIG. 2, except for the fact that the maxima and minima for each frequency are displaced by one quarter wavelength over that shown in FIG. 3. This results from the fact that at the short circuited end, the current is at a maximum and the voltage is minimum, whereby the RF magnetic field for all frequencies is maximum at that end rather than at a null as at position 14 in FIG. 3. In all other respects however, the operation is similar and the component frequencies are separated as described.

It will be appreciated by those skilled in the art that many changes may be made in the embodiment described without departing from the spirit and scope of the invention. For example, the slow wave structure needs not be in the form of a helix but may take other forms as known to those skilled in the art. The tuning magnet structure may also be varied to provide different spatial configurations of the tuning magnetic field. Since these and other changes may be made, this invention is to be considered as limited only by the following claims.

What is claimed is:

1. A broad band transducer for radio frequency signals comprising: a delay line structure having a physical length that is long at the frequency bandwith of the radio frequency signals to be transduced, and being energizable by said radio frequency signal to be converted, said delay line having a plurality of spaced output positions along its length, a spin resonant material disposed in energy absorptive relationship with said spaced output positions, and a magnetic field producing means for energizing said spin resonant material thereby to tune the material into energy absorptive relationship with the radio frequency signal being produced at said positions.

2. A broad band transducer for radio frequency signals comprising: a substantially nonresonant delay line structure comprising a series of turns of conductive material spaced along a given region, means for applying said radio frequency signal to be transduced to said delay line whereby said radio frequency signal is successively reproduced along the length of the delay line, a spin resonant material disposed in energy absorptive relationship with the delay line windings along its length, and magnetic field producing means for applying a magnetic field to said spin resonant material, thereby to tune the spin resonant material into energy absorptive relationship with the radio signal.

3. A broad band transducer for pulsed radio frequency signals comprising: a slow wave structure for high frequency radio signals and having an input and a balanced output, means for applying said pulsed radio signal to the input of said slow wave structure, a spin resonant material disposed in energy absorptive relationship along the length of the slow wave structure thereby to be successively energized by said radio frequency pulses traveling along the length of the slow wave structure, and magnetic field producing means or applying a magnetic field to said spin resonant material to frequency tune said spin resonant material into energy absorptive relationship with said radio frequency pulses.

4. A broadband transducer for radio frequency signals comprising: a substantialy non-resonant travelling wave medium responsive to said radio frequency signal to be transduced for receiving said signals and applying the signals to a plurality of spaced positions, a spin resonant material disposed at each of said spaced positions in energy absorptive relationship with said signal to transduce the radio signals to energy at a different frequency, a magnetic field producing means for applying a low frequency magnetic field to said spin resonant material at said different positions thereby to tune the spin resonant material into energy absorptive relationship with said radio frequency signals, and means responsive to said different frequency for reading out the energy from the spin resonant material.

5. A process for transducing a multifrequency radio signal comprising: providing a standing wave of each of the component frequencies of the signal along a given region to spatially separate the maxima of the frequency components, applying a nonunifrom tuning magnetic field along said region having predetermined intensities at the positions where maxima of the standing waves occur, and exposing a spin resonant material to said positions along said region to receive said predetermined intensities of the tuning magnetic field and the standing waves of the radio signal.

6. A process for recording a radio signal comprising: providing a standing wave of the signal along a given region having a different maxima position for each component frequency of the signal to be transduced, exposing a spin resonant material to said standing wave over said region, and magnetically tuning said spin resonant material into energy absorptive relationship with the standing wave.

7. In the process of claim 6, the step of magnetically tuning the spin resonant material being performed by applying different intensity magnetization at the positions of maxima for the different component frequencies thereby to record a frequency spectrum.

8. A method of recording radio frequency signals comprising: providing a standing wave pattern of the signal along the length of a stationary mass of spin resonant material having maxima and minima positions along the mass, magnetically tuning said mass into energy absorptive relationship with the standing wave to provide a succession of transiently changing heat images in the mass corresponding to time variations of the signal, and transferring the succession of heat images to a movable record member that is successively maintained in heat transferring relationship to the mass.

9. A process for transducing a radio signal into a spectral image having the different frequency components at different positions therein comprising: producing a standing wave of the signal with each component frequency of the signal having a maxima at a different position along a region, providing a spin resonant mass at said different positions, and magnetizing said spin resonant mass at said different positions at different intensities corresponding to the different frequencies at said positions.

References Cited

UNITED STATES PATENTS 2,952,503  9/1960  Becker _____ 340—173

TERRELL W. FEARS, *Primary Examiner.*